G. P. HOY.
HAY STACKING APPARATUS.
APPLICATION FILED MAY 22, 1920.
1,371,897.
Patented Mar. 15, 1921.
3 SHEETS—SHEET 2.
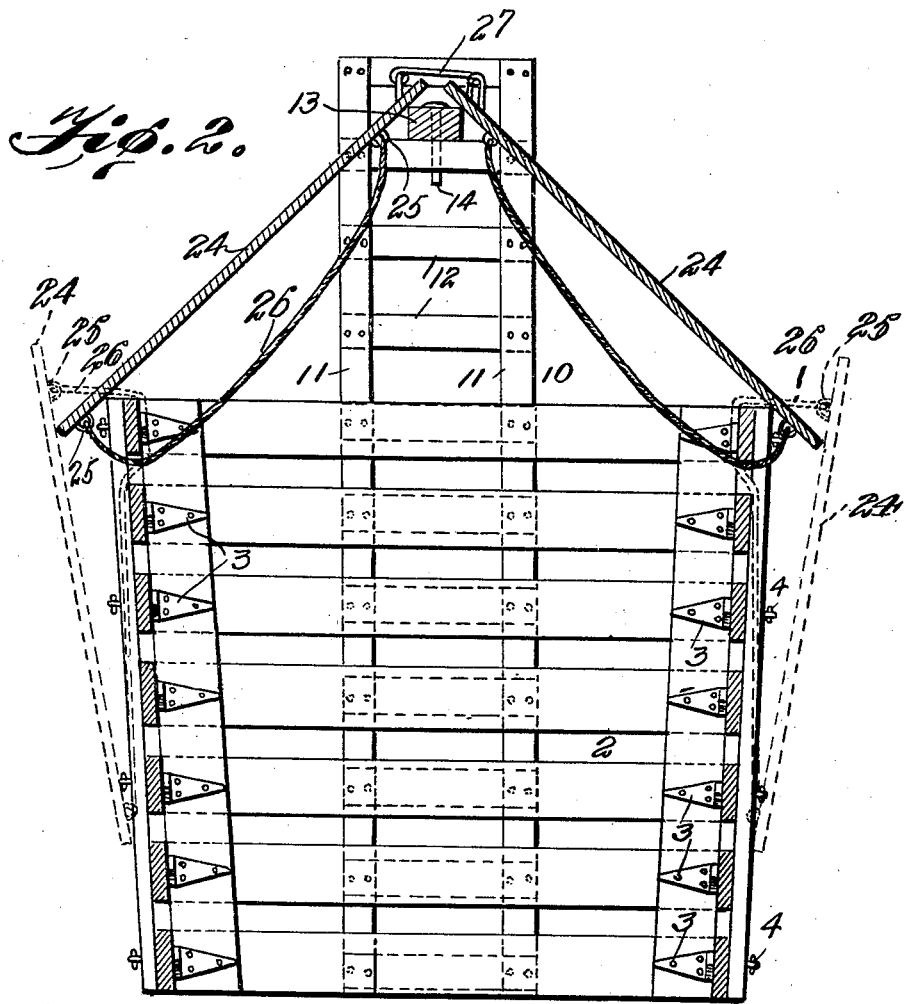
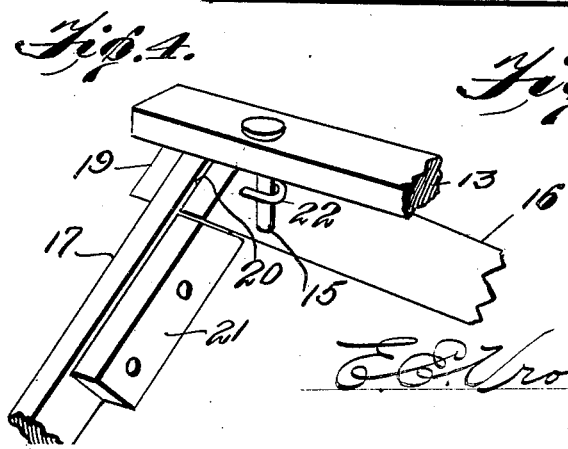
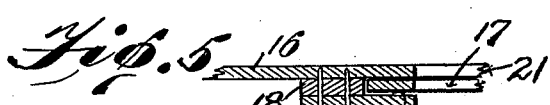
INVENTOR.
G. P. Hoy.
BY
his ATTORNEYS.

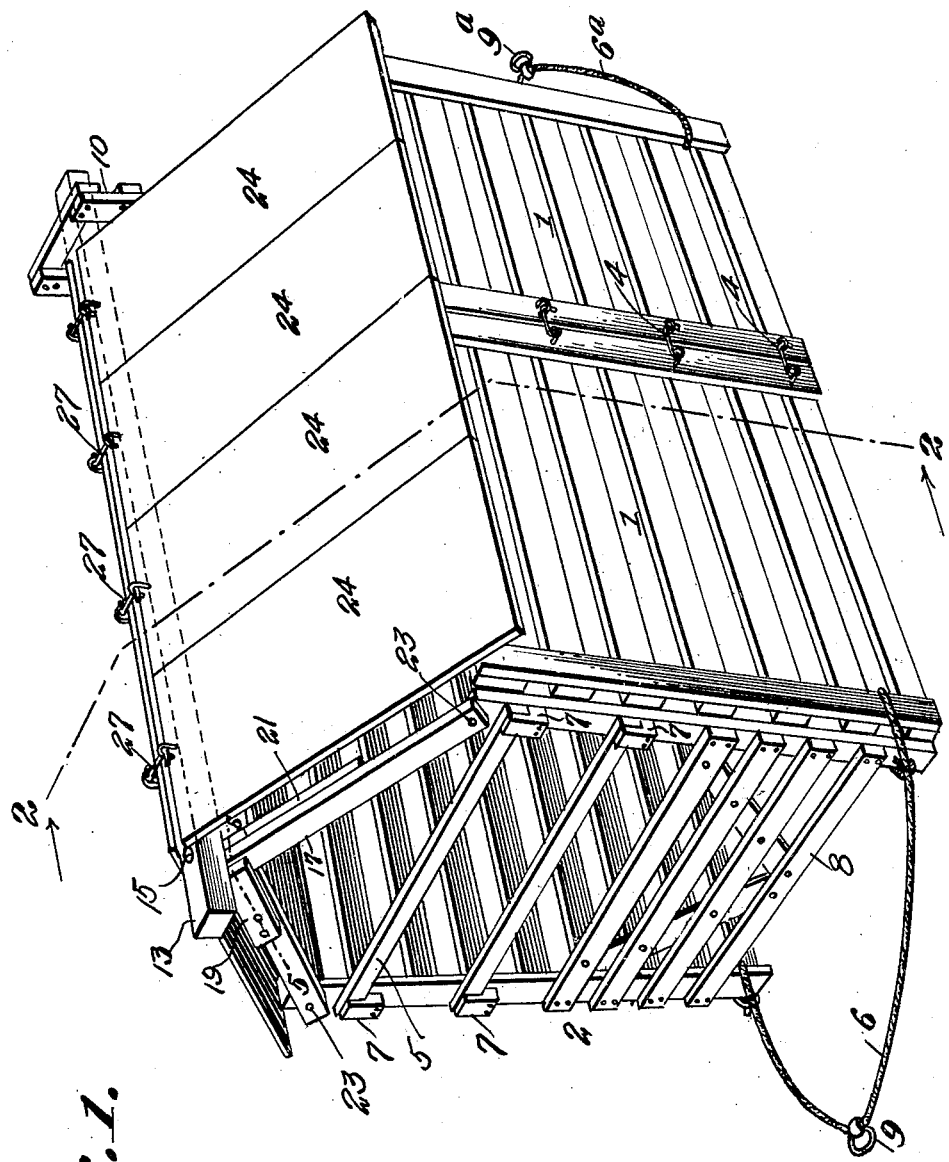

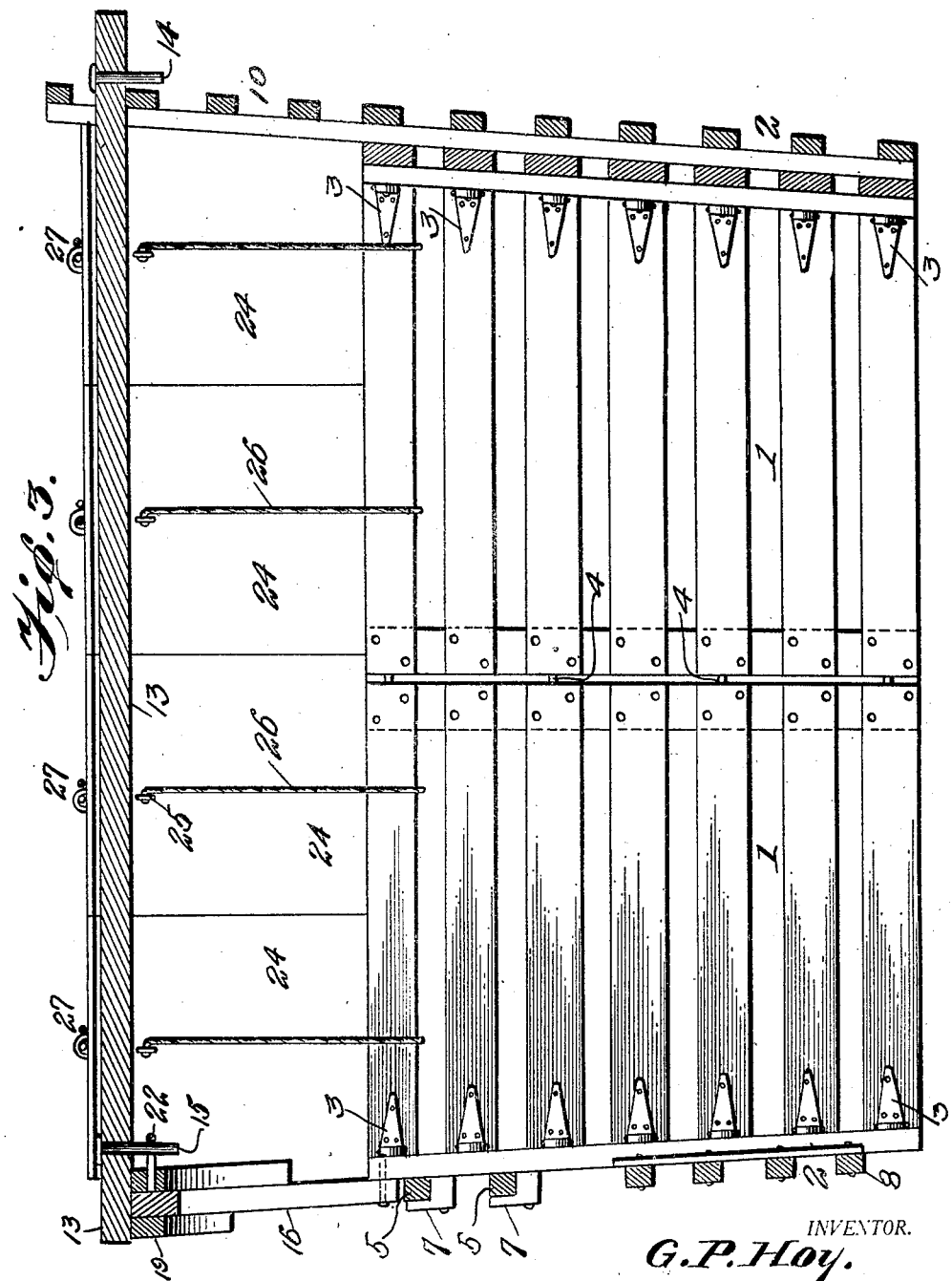

UNITED STATES PATENT OFFICE.

GEORGE P. HOY, OF WESTPOINT, NEBRASKA.

HAY-STACKING APPARATUS.

1,371,897.  Specification of Letters Patent.  Patented Mar. 15, 1921.

Application filed May 22, 1920. Serial No. 383,443.

*To all whom it may concern:*

Be it known that I, GEORGE P. HOY, a citizen of the United States, residing at Westpoint, in the county of Cuming and State of Nebraska, have invented certain new and useful Improvements in Hay-Stacking Apparatus, of which the following is a specification, reference being had therein to the accompanying drawings.

This invention relates to a hay stacking apparatus and has for its object the construction of an apparatus that can be moved around a field, to any desired location, and which can be set-up or taken down, for the purpose of storing it away in a suitable place, with comparative ease and in a relatively short time.

Another object of the invention is the construction of a peculiar frame or apparatus that will facilitate the construction of a hay or a grain stack or rick in a field during high winds, or even during a stormy period, because the frame will keep straw or hay from blowing away during the formation of a stack or rick, and even by quickly placing the roof structure in place, the unfinished stack or rick can be further protected to a great extent against the weather.

With these and other objects in view, my invention comprises certain novel combinations, constructions and arrangements of parts as will be hereinafter described, illustrated in the accompanying drawings, and more particularly pointed out in the appended claims.

In the drawings:

Figure 1 is a perspective view of an apparatus constructed in accordance with the present invention.

Fig. 2 is a sectional view taken on line 2—2, Fig. 1, and looking in the direction of the arrows.

Fig. 3 is a longitudinal sectional view of the apparatus.

Fig. 4 is a fragmentary perspective view of the ridgepole supported at one end upon the primary and auxiliary hip-rafters.

Fig. 5 is a sectional view taken on line 5—5, Fig. 1.

Referring to the drawings by numerals, 1 designates the side sections, and 2 the end sections, the side and end sections being connected together by hinges 3, and the contiguous or abutting ends of the side sections are connected by latch devices 4, whereby the side and end sections can be quickly detached and folded, when it is desired to transport or store the device, in a folded condition, or when set-up, the body, constituted by the side and end sections, can be quickly fastened together by means of the latch devices.

The bars 5 on the front end, to which end the hauling rope 6 is attached, Fig. 1, are detachably mounted upon the brackets 7, so that these bars can be quickly removed by lifting them off the brackets or sliding the same to one side, permitting the operator to readily enter the apparatus.

In Fig. 1, it will be seen that the front end section has not the lowest board or slot 8 at the extreme lowest end of the section, because it may be desirable to place a wheeled platform or wagon under this end, to facilitate dragging the section of the body, constituted by the front end section and the hinged side sections, away from the stack or rick, after it has been formed; further, the hauling rope, with the ring 9, also produces means for hitching a team to the front and side sections.

It is to be noted (Figs. 2 and 3) that the body of the frame or apparatus diverges from its bottom to its top, so that the stack or rick may be properly formed for preventing water from entering too far into its sides; it is common, in forming stacks or ricks, to have the top portion of the body of the stack broader or wider than the bottom and I have constructed my apparatus to incorporate this feature, when forming a stack or rick, by using my apparatus.

It is to be understood that the hauling rope $6^a$, provided with an attaching ring $9^a$ can be, and preferably is, fastened to the other end section and side sections for providing means for readily attaching a team to these sections of the body, for removing the sections from a completed stack or rick.

To the rear end section is fastened a ladder 10, which ladder comprises the vertical standards 11 and the rungs 12. This ladder provides efficient means for the workmen to climb to the top of the apparatus, or to the top of the stack or rick, and also produces means for supporting one end of the ridgepole 13.

The ridgepole 13 has, near its ends, detachable pins or retaining devices 14 and 15. The ridgepole, at one end, is run through the ladder, with the pin 14 at the outer side of one of the rungs, thereby fastening the ridgepole upon the ladder, whereas, the opposite end of ridgepole rests against the top edges of the primary hip-rafter 16 and the auxiliary hip-rafter 17. The primary hip-rafter 16 is provided with a filler block 18, and attached to the filler block is an outer piece 19; this attaching of the outer piece 19 and block 18 to the primary hip-rafter produces a pocket 20, at the upper end of the primary hip-rafter, into which pocket 20 extends the upper end of the auxiliary hip-rafter 17. To the side of the auxiliary hip-rafter 17 is fastened a block 21 that is engaged, at its upper end, by the primary hip-rafter 16, so that an interlocking structure is formed at the upper ends of the two hip-rafters for efficiently retaining them together during the supporting of the ridgepole 13. A staple 22 extends from the inner face of the primary hip-rafter 16, near the upper end of said rafter, and the retaining pin 15 extends through this staple for preventing displacement of the ridgepole off the hip-rafters. Therefore, it will be seen that one end of the ridgepole is supported upon the ladder and the other end of said pole is supported upon the hip-rafters. Upon removing the retaining pin 15, by lifting or sliding the ridgepole 13 off the hip-rafters, they will be permitted to swing or pivot, at 23, to one side to place them out of the way, during the formation of the stack or rick, but in the case of an approaching storm, these hinged hip-rafters can be quickly swung into engagement at their upper ends, whereupon the ridgepole 13 is placed in position for receiving the roof sections 24.

The roof sections 24 are each provided on its inner face and near its ends with eyes or loops 25, to which are fastened the members or ropes 26. These ropes 26 and eyes 25 permit the sections 24 to be suspended upon the side of the body, as shown in dotted lines in Fig. 2. When it is desired to quickly form a roof over the body of the apparatus, the suspended roof sections 24 can be quickly drawn upward over the body, causing their top ends to rest upon the ridgepole and then the latch or fastening devices 27 are utilized for temporarily, but securely, retaining the contiguous ends of the roof sections in position, upon the ridgepole, as shown clearly in Figs. 1, 2 and 3. Upon unfastening the latch devices 27, the roof sections can be quickly dropped to their suspended position upon the sides of the body, out of the way, during the formation of the stack or rick. The roof sections fit snugly together and shed the greater amount of rain or snow that may fall upon the roof, thereby preventing any material damage being done to an incomplete stack or rick.

The apparatus may be quickly moved in a set-up or assembled position from one part of a field to another part of a field by running under the apparatus a suitable wheeled platform drawn by horses or a tractor engine, then after the apparatus has been placed upon this wheeled platform, it is ready to be transported. However, suitable axles of any ordinary type may be provided upon the frame for journaling ordinary wheels thereon, whereby the apparatus can be wheeled to any part of a field at the will of the operator, or even ordinary sled runners can be utilized for drawing the set-up apparatus, or frame, to different parts of a field, all of which devices or means for transportation, being old in the art, are not shown in the accompanying drawings, but are mentioned in the specification to bring out the ease with which the apparatus may be transported from one part of a field to another, for forming stacks or ricks in different parts of a field.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In an apparatus of the class described, the combination of a body, a ladder secured to one end of the body and extending above the same, hip-rafters secured to the other end of the body, a ridgepole resting near one end upon a rung of the latter and near the opposite end upon the hip-rafters, and roof sections supported by the body and by the ridgepole.

2. In an apparatus of the class described, the combination of a body provided at one end with a ladder and at its opposite end with hip-rafters, a ridgepole detachably fastened upon said ladder and said hip-rafters, and roof sections detachably fastened upon the ridgepole and the body.

3. In an apparatus of the class described, the combination with a body, of a ladder fastened to said body and extending above the same, hip-rafters supported upon said body, a ridgepole extending at one end through the ladder and extending at its other end across the hip-rafters, and roof sections resting at their upper ends upon the ridge-pole and at their lower ends upon the body.

4. In an apparatus of the class described, the combination with a body, of a ladder against the body and including rungs, hip-rafters supported by the body, a ridge-pole extending through the ladder and resting upon one of its rungs and extending also across the top of the hip-rafters, a staple extending from one of the hip-rafters, securing pins extending through the ridgepole and one of the pins engaging the outer face of a rung of the ladder and the other pin extending through the staple, and roof sections resting upon the body and ridgepole.

5. In an apparatus of the class described, the combination with a body, of a ridgepole supported upon said body, roof sections resting upon the body and the ridgepole, each roof section provided with eyes on its inner face, a rope fastened at its ends to the eyes and threaded through a portion of the body, whereby the roof section may be suspended out of the way upon the side of the body, and means securing the roof sections in an assembled position upon the ridgepole.

6. In an apparatus of the class described, the combination with a body, of a ridgepole carried by said body, roof sections resting upon said body and ridgepole, means engaging the body and attached to the roof sections for suspending and permitting sliding movement of the roof sections upon the sides of the body, and means for fastening the roof sections upon the ridgepole.

7. In an apparatus of the class described, the combination with a body, of a ridgepole carried by said body, slidable roof sections suspended upon the sides of said body, and means extending across the top of the ridgepole and connected to the roof sections for temporarily securing the roof sections in an assembled position upon the ridgepole.

8. In an apparatus of the class described, the combination with a body, of a pair of hip-rafters pivotally mounted at their lower ends upon the body and interlocking at their upper ends, a ridgepole supported near one end upon the interlocking upper ends of the hip-rafters, means supporting the ridgepole near its other end upon the body, and roof sections resting upon the ridgepole and the body.

9. In an apparatus of the class described, the combination with a body, of a primary and an auxiliary hip-rafter pivotally mounted at their lower ends upon the body, said primary hip-rafter provided with a filler block and with an outer piece secured to the filler block, said block and outer piece producing a pocket on the upper end of said primary hip-rafter, said auxiliary hip-rafter having its upper end seated in said pocket, a block secured to said auxiliary hip-rafter and having its upper end positioned contiguous to the primary hip-rafter, a staple secured to the inner face of the primary hip-rafter near its upper end, a ridgepole resting across the upper ends of the hip-rafters, a retaining pin extending through the ridgepole and into the staple, means supporting the other end of the ridgepole upon the body, and roof sections resting upon the ridgepole and the body.

10. In an apparatus of the class described, the combination of a body provided at one end with a ladder and at its opposite end with a pair of pivotally mounted interlocking hip-rafters, a ridgepole extending through the ladder and across the interlocking hip-rafters, means detachably securing said ridgepole in an adjusted position upon the ladder and the interlocking hip-rafters, and roof sections slidably mounted upon the body and detachably secured at their upper ends across the hip-rafters.

11. In an apparatus of the class described, the combination with a body provided with a ridgepole supported thereon, of slidable roof sections resting across the top of the ridgepole and the top of the body, flexible retaining means attached to each roof section and threaded through a portion of the body, whereby the roof section will be loosely retained upon the outer face of the body, and means detachably securing the roof sections in an assembled position upon the ridgepole.

In testimony whereof I hereunto affix my signature.

GEORGE P. HOY.